Patented Jan. 30, 1951

2,539,728

UNITED STATES PATENT OFFICE 2,539,728

SILVER SALTS OF DISUBSTITUTED METHANE COMPOUNDS

Alfred Brewerton Craven, Selby, and Gordon James Pritchard, London, England, assignors to Ward, Blenkinsop & Company Limited, London, England, a British company No Drawing. Application February 13, 1948, Serial No. 8,284. In Great Britain December 16, 1942

Section 1, Public Law 690, August 8, 1946
Patent expires December 16, 1962

4 Claims. (Cl. 260—430)

This invention relates to improvements in and relating to the manufacture of preparations for the treatment of the skin, cuts, burns, abrasions and the like.

We have found that certain new compounds which are silver derivatives of a group of substances, to be hereinafter defined, and which can be described as disubstituted methanes can advantageously be used for application to the skin.

The disubstituted methane compounds which are hereinafter referred to as "D. S. M." compounds have the general formula $R_1R_2CH_2$ where $R_1$ may be A phenol sulphonic acid,
An alkyl phenol sulphonic acid,
A carboxyl phenol sulphonic acid,
A diphenyl or alkyl diphenyl mono or disulphonic acid,
A benzene sulphonic acid,
A sulpho benzoic acid,
A naphthalene or alkylnaphthalene mono or disulphonic acid,
A naphthol or alkyl naphthol sulphonic acid, or
A nuclear substituted halogen derivative of any of the above substances, and $R_2$ may either be identical with $R_1$ or may be any other member of the group of substances mentioned for $R_1$.

The new compounds which we prepare according to the invention consist of silver derivatives of the D. S. M. compounds.

The remarkable property of these silver D. S. M. derivatives is their power, when applied in the form of a dilute aqueous solution, preferably slightly acid to penetrate skin and protein or cellulose containing material for instance, to depths up to 1 millimetre where they exert their powerful antibacterial effect upon pathogenic organisms which have deeply invaded the infected area. This is a marked and important advantage over such antiseptics as acriflavine, chlorcresol, mercuric &c., which effect stasis of superficial infecting organisms only. In addition, the silver D. S. M. derivatives cause slight coagulation of the tissue protein thereby fastening themselves in such a way that they cannot be removed by washing with water. This property renders the compounds very useful for application to the skin or other surfaces for instance for the treatment of burns and scalds and for pre-operative sterilisation of the skin and in other cases where it is desired to fix the compound in the skin or other material to be treated; the coagulation of protein is sufficient to retard general absorption of toxic substances from the site of the burn but is insufficient to engender any contractile effect. Moreover substances possessing an amino group, which are therapeutically active when applied to the skin, when dissolved in a solution of silver the D. S. M. derivative adjusted to pH 4 to 5 and applied, penetrate the skin and by virtue of the protein coagulating property of the D. S. M. compound are fixed and cannot be removed by ordinary washing.

The aforesaid silver D. S. M. compounds may be applied in aqueous solution at concentrations of the order of 1% which are usually adjusted to a pH value of between 4.0 and 6.5 by the addition of mineral acid and/or D. S. M. acid. Said compounds may, in suitable circumstances, be used in other forms e. g. in the form of powders, ointments, emulsions, suspensions, or dispersions. Moreover such compounds may be mixed with other products which are therapeutically active or which beneficially affect the property of the D. S. M. compound.

For the better understanding of the present invention the following examples of the preparation of some of these new compounds are given by way of illustration only:

Example I 12 parts by weight of naphthalene 2-sulphonic acid are warmed and treated in four equal portions with a total of 2.4 parts by weight of formaldehyde solution (40% solution) whilst warming the reaction mixture at 100° C. When the smell of formaldehyde disappears 300 parts by weight of water are added, and the solution of the D. S. M. compound treated with precipitated silver oxide equivalent to 7 parts $Ag_2O$. The solution is then evaporated until the silver derivative separates in the solid form as a dark brown powder (18 parts).

Found $Ag = 33.6\%$.
$C_{21}H_{14}S_2O_6Ag_2$ requires $Ag = 33.6\%$.

The substance is soluble in water with production of a dark fluorescent brown solution. A solution containing one per cent of the compound is adjusted to pH 4–5 by addition of D. S. M. compound and is then ready for application to the skin. Sulphanilamide (½%) may also be dissolved in this solution.

Example II 16 parts by weight of naphthalene 2.7 disulphonic acid are treated with 1.5 parts by weight of formaldehyde (36% solution) and heated at 100° C. for 6 hours. A further 0.25 parts of formaldehyde (36% solution) are then added and the whole heated for a further two hours when at the end of this time all the formaldehyde is absorbed.

The whole is diluted with water (25 pts.) and the solution containing the D. S. M. compound treated with freshly precipitated silver oxide equivalent to $Ag_2O$ (14.0 pts.). After filtering the solution is evaporated to yield 26 parts of the silver D. S. M. derivatives as a buff powder.

Found Ag=41.7%.

$C_{21}H_{12}S_4O_{12}Ag_4$ requires Ag=42.5%.

In a similar manner a mixture of naphthalene 2.6 and 2.7 disulphonic acids may be treated as described above to yield a mixture of the corresponding D. S. M. silver compounds as a buff powder.

Found Ag=43.0.

$C_{21}H_{12}S_4O_{12}Ag_4$ requires Ag=42.5%.

Both of the preceding compounds described are readily soluble in water to give a dark amber solution, a 1% solution is adjusted to pH4-5 preferably by the addition of D. S. M. compound, and 0.25% sulphanilamide may conveniently be incorporated therein.

*Example III*

4.5 parts by weight of 2-naphthol 6-sulphonic acid are warmed with 5 parts by weight of water to effect solution and then cooled. 0.76 part by weight of formaldehyde (40% solution) is introduced and the whole allowed to stand at room temperature for 24 hours. At the end of this time the reaction mass was diluted with 20 parts of water, and warmed to 100° C. for half an hour; a further 150 parts of water were then added. This solution of the D. S. M. compound was then warmed with freshly precipitated silver oxide equivalent to $Ag_2O$ (2.5 parts). The solution was filtered and evaporated until 6 parts of the silver derivative separated as a dark red powder.

Found Ag=31.8%.

$C_{21}H_{14}S_2O_8Ag_2$ requires Ag=32%.

The substance is soluble in water with the production of a reddish brown fluorescent solution. A solution containing one per cent of the compound is adjusted to pH 4-5 by the addition of the D. S. M. compound.

We claim:

1. As a new compound a silver salt of a compound of the general formula $R^1CH_2R^2$ where $R^1$ and $R^2$ are each selected from the group consisting of phenol sulphonic acids, alkyl phenol sulphonic acids, carboxyl phenol sulphonic acids, diphenyl and diphenyl alkyl mono- and disulphonic acids, benzene sulphonic acids, naphthalene and alkyl naphthalene mono- and disulphonic acids, sulpho benzoic acid, naphthol and alkyl naphthol sulphonic acids, and nuclear substituted halogen derivatives of these acids.

2. Silver bis-(naphthalene-2-sulphonic acid) methane.

3. Silver bis - (naphthalene - 2:7 - disulphonic acid) methane.

4. Silver bis-(2-naphthol-6-sulphonic acid) methane.

ALFRED BREWERTON CRAVEN.
GORDON JAMES PRITCHARD.

REFERENCES CITED

The following references are of record in the file of this patent:

UNITED STATES PATENTS

| Number | Name | Date |
| --- | --- | --- |
| 1,986,044 | Casaburi | Jan. 1, 1935 |

FOREIGN PATENTS

| Number | Country | Date |
| --- | --- | --- |
| 547,564 | Great Britain | Sept. 2, 1942 |
| 552,751 | Great Britain | Apr. 22, 1943 |
| 386,469 | Germany | Dec. 13, 1923 |